(12) United States Patent
Higashi

(10) Patent No.: US 8,886,977 B2
(45) Date of Patent: Nov. 11, 2014

(54) DATA PROCESSING APPARATUS, DATA PROCESSING METHOD, AND STORAGE MEDIUM FOR COMMUNICATING WITH EXTERNAL APPARATUS

(75) Inventor: Hidenori Higashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 13/309,399

(22) Filed: Dec. 1, 2011

(65) Prior Publication Data

US 2012/0151229 A1   Jun. 14, 2012

(30) Foreign Application Priority Data

Dec. 13, 2010   (JP) .................................. 2010-276593

(51) Int. Cl.
*G06F 1/26* (2006.01)
*G06F 1/32* (2006.01)

(52) U.S. Cl.
CPC ............... *G06F 1/3278* (2013.01); *Y02B 60/32* (2013.01); *Y02B 60/126* (2013.01)
USPC ......................................................... 713/320

(58) Field of Classification Search
CPC ...... G06F 1/3285; G06F 1/325; G06F 1/3278
USPC ................................................. 713/300, 320
See application file for complete search history.

(56) References Cited

U.S. PATENT DOCUMENTS

| | | | |
|---|---|---|---|
| 6,590,875 B1 * | 7/2003 | Niwa ............................. | 370/328 |
| 7,024,498 B2 * | 4/2006 | Lee et al. ........................ | 710/52 |
| 7,127,272 B1 * | 10/2006 | Almaleh et al. ............... | 455/561 |
| 7,602,799 B2 * | 10/2009 | Ikeda et al. .................... | 370/419 |
| 8,368,927 B2 * | 2/2013 | Sako .............................. | 358/1.15 |
| 2006/0217125 A1 * | 9/2006 | Miyazaki ....................... | 455/453 |
| 2007/0064733 A1 * | 3/2007 | Osawa et al. .................. | 370/468 |
| 2007/0240004 A1 | 10/2007 | Maeda | |
| 2008/0055638 A1 * | 3/2008 | Okamoto et al. ............. | 358/1.15 |
| 2008/0133950 A1 * | 6/2008 | Kawaji .......................... | 713/320 |
| 2009/0248890 A1 * | 10/2009 | Shouno .......................... | 709/232 |
| 2010/0303528 A1 * | 12/2010 | Yamamoto .................... | 399/364 |

FOREIGN PATENT DOCUMENTS

| | | |
|---|---|---|
| CN | 101800814 A | 8/2010 |
| CN | 101888400 A | 11/2010 |
| JP | 2000-165419 A | 6/2000 |
| JP | 2002-077303 A | 3/2002 |
| JP | 2004-128698 A | 4/2004 |
| JP | 2005-066894 A | 3/2005 |
| JP | 2006-332807 A | 12/2006 |
| JP | 2007-276341 A | 10/2007 |
| JP | 2008-269261 A | 11/2008 |
| JP | 2009-151537 A | 7/2009 |

* cited by examiner

*Primary Examiner* — Mohammed Rehman
(74) *Attorney, Agent, or Firm* — Canon USA, Inc. IP Division

(57) ABSTRACT

A data processing apparatus includes a control unit configured to control data processing, and a communication unit configured to communicate with other apparatuses. The control unit determines, before the control unit shifts to a predetermined power-saving state, a communication speed of the communication unit to communicate with the other apparatuses when the control unit is in the power-saving state, based on an amount of packets received by the communication unit, and sets the determined communication speed for the communication unit. The communication unit communicates with the other apparatuses at the set communication speed, when the control unit is in the power-saving state.

10 Claims, 6 Drawing Sheets

DATA PROCESSING APPARATUS, DATA PROCESSING METHOD, AND STORAGE MEDIUM FOR COMMUNICATING WITH EXTERNAL APPARATUS

BACKGROUND OF THE INVENTION

1. Field of the Invention

The present invention relates to data processing apparatus, data processing method, and a storage medium that has stored a program for executing the data processing method.

2. Description of the Related Art

In the technical field of data processing apparatuses, there is growing need to reduce power consumption which the data processing apparatuses unnecessarily consume. One known approach to the need is a technique for reducing power consumption in an inactive state by reducing (or interrupting) power supply to a main control unit controlling a data processing apparatus more than in a normal state, in a state where the data processing apparatus does not operate (inactive state).

Further, the communication function is being embedded in the data processing apparatuses as a standard feature. Such a data processing apparatus can perform various kinds of data processing by receiving data and a command from an information processing apparatus, such as a personal computer, over the network and processing the data and command.

In the data processing apparatus having such a communication function, there is available a technique for reducing a portion of electric power of the data processing apparatus, while maintaining the communication function of the data processing apparatus.

For example, Japanese Patent Application Laid-Open NO. 2009-151537 discussed a technique in which, in a state where power supply to the main control unit is reduced (or interrupted) more than in a normal state, the communication unit, upon receiving a network packet which can be responded to by itself, implements network response without returning the power supply to the main control unit to the normal state.

In a technique discussed in Japanese Patent Application Laid-Open NO. 2009-151537, power-saving is realized by reducing power consumption of the main control unit.

Furthermore, additional power-saving can be realized by reducing power consumption in the communication unit. However, one wants to avoid communication capability from ceasing to be appropriate as a result of having reduced power consumption of the communication unit.

For example, in a case where power-saving of the communication unit has been realize by lowering a communication speed of the communication unit, under an environment in which the communication amount is large, an amount of data which fails to be acquired will be increased.

On the other hand, it is a waste of the power consumption of the communication unit to keep the communication speed of the communication unit high, under an environment in which the communication amount is small.

SUMMARY OF THE INVENTION

According to an aspect of the present invention, an apparatus comprises a control unit configured to control data processing, and a communication unit configured to communicate with other apparatuses. The control unit includes a determination unit configured to determine, before the control unit shifts to a predetermined power-saving state, a communication speed of the communication unit to communicate with the other apparatuses when the control unit is in the power-saving state, based on an amount of packets received by the communication unit, and a setting unit configured to set the communication speed determined by the determination unit for the communication unit. The communication unit communicates with the other apparatuses at the communication speed set by the setting unit, when the control unit is in the power-saving state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment will be described.

Figure 1:
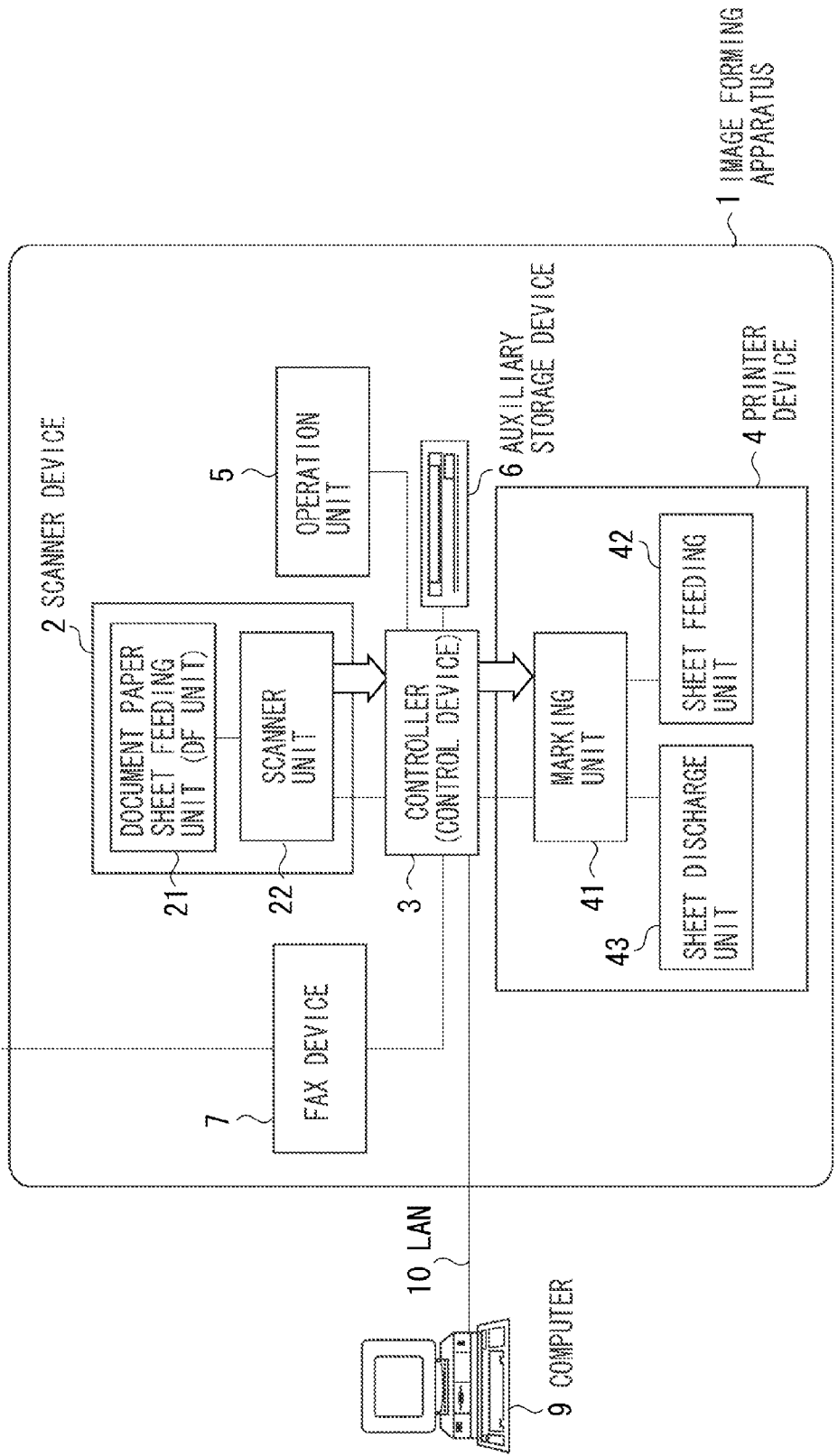
FIG. 1 is a diagram illustrating a configuration of an image processing system.

FIG. 1 is a diagram illustrating the configuration of an image processing system including a data processing apparatus according to the present exemplary embodiment. In the present exemplary embodiment, an image forming apparatus will be described as an exemplary embodiment of the data processing apparatus that can communicate with other apparatuses. The data processing apparatus is not limited to the image forming apparatus of the present example, but as long as a device performs data communication with other apparatuses, the present invention can be applied to the device. In FIG. 1, a scanner device 2 optically reads out an image from a document and converts it into a digital image. A printer device 4 outputs digital image onto a paper device.

An operation unit 5 is used to perform operation of the present apparatus. An auxiliary storage device 6 stores digital images and control programs and the like. A FAX device 7 transmits the digital image to a telephone line or the like. A controller 3 controls processing of respective functions of the above-described scanner device 2, the printer device 4, the auxiliary storage device 6, and the FAX device 7 each connected thereto. The controller 3, upon receiving a print job from a computer 9 connected thereto via a local area network interface (LAN I/F) 8, performs print function processing, facsimile transmission processing and the like. An image forming apparatus 1 is configured so that input and output processing of digital image data, issuance of a job and instruction to a device and the like can be implemented from the computer 9 via a LAN 10.

The scanner device 2 includes a document feeding unit 21 capable of automatically and sequentially replacing document bundles, and a scanner unit 22 capable of optically scanning a document and converting it into digital image. The converted image data is transmitted to the controller 3.

The printer device 4 includes a marking unit 41 for printing the image data onto a fed paper sheet, a sheet feeding unit 42 capable of sequentially feeding paper sheets one by one from the paper bundle, and a sheet discharge unit 43 for discharging the paper sheets after printing.

Figure 2:
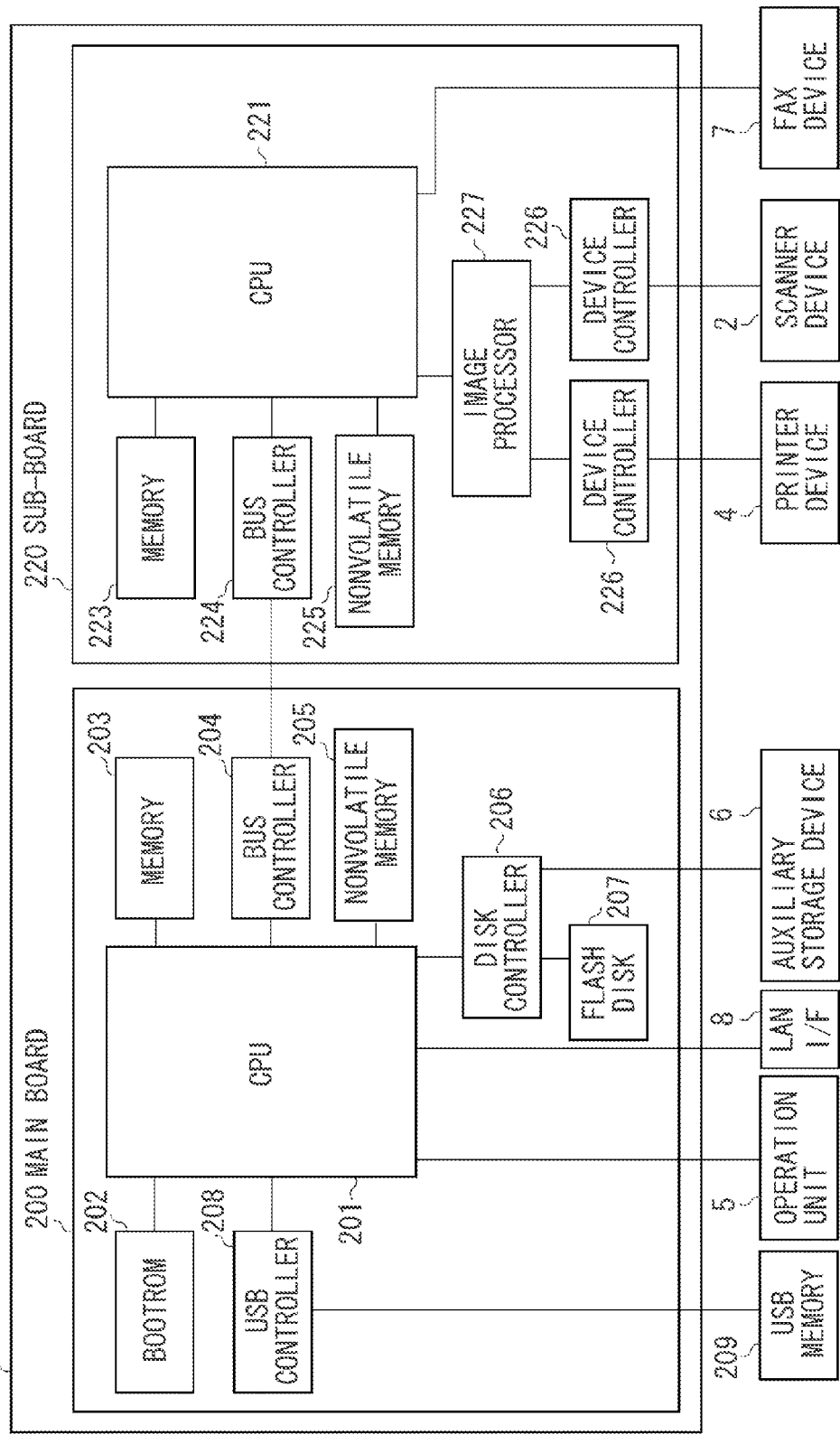
FIG. 2 is a block diagram illustrating a configuration of a controller illustrated in FIG. 1.

FIG. 2 is a block diagram illustrating a configuration of the controller 3 illustrated in FIG. 1. The controller 3 is a control unit of the data processing apparatus. In FIG. 2, the controller 3 includes a main board 200, and a sub-board 220. The image forming apparatus 1 has a power source device and a power ON/OFF unit (not illustrated). The power source device supplies electric power via a feeder line to each of the main board 200, the sub-board 220, the operation unit 5, the LAN I/F 8, the auxiliary storage device 6, the printer device 4, the scanner device 2, and the FAX device 7. The power ON/OFF unit turns on or off supply of electric power to each unit. A central processing unit (CPU) 201 controls supply of electric power to each unit, by controlling the power ON/OFF unit. When the controller 3 shifts from a normal mode to a power-saving mode, the controller 3 goes into a power-saving state. Thereby, the power consumption of the image forming apparatus 1 is significantly suppressed. In the power-saving mode, supply of electric power to the main board 200 and sub-board 220 is restricted. For example, power feeding to the main board 200 and sub-board 220 is stopped, or power feeding is performed to only a part of the main board 200 and the sub-board 220. Furthermore, when the LAN I/F 8, upon receiving a call, determines that it is necessary to return the controller 3 to the normal mode from the power-saving mode, the LAN I/F 8 controls the power ON/OFF unit to return the controller 3 to the normal mode. In the normal mode, supply of electric power to the main board 200 and the sub-board 220 is performed. In this process, the case where it is necessary to return the controller 3 to the normal mode from the power-saving mode, includes, for example, a case where, upon receiving a job from the computer terminal, the controller 3 causes the printer device 4 to perform printing based on the job.

The main board 200 is general-purpose CPU system, and includes the following: the CPU 201 that controls the entire board, a boot read-only memory (ROM) 202 in which a boot program is included, and a memory 203 which the CPU 201 uses as a work memory. Furthermore, the main board 200 includes a bus controller 204 having a bridge function with an external bus, and a non-volatile memory 205 that is non-erasable even when power is turned off. Furthermore, the main board 200 includes a disk controller 206 that controls storage device, a flash disk (e.g., a solid state device (SSD)) 207, which is a storage device with relatively small capacity composed of semiconductor devices, and a universal serial bus (USB) controller 208 capable of controlling USBs. To the main board 200 are externally connected a USB memory 209, the operation unit 5, the LAN I/F 8, the auxiliary storage device 6, and the like.

The sub-board 220 includes a relatively small general-purpose CPU system, image processing hardware, which are composed of the following. The sub-board 220 comprises a CPU 221 that controls the entire board, a memory 223 which the CPU 221 uses as a work memory, and a bus controller 224 having a bridge function with an external bus. Furthermore, the sub-board 220 comprises a non-volatile memory 225 that is non-erasable even when power is turned off, and additionally, an image processor 227 that implements real time digital image processing, and a device controller 226.

FIG. 2 is a simplified block diagram. For example, in the CPU 201 and the CPU 221, a number of hardware devices around the CPUs such as a chip set, a bus bridge, a clock generator are included. Since they are unnecessary in terms of granularity of explanations, they are illustrated in a simplified way, and the block configuration is not intended to limit the present invention.

Hereinbelow, operation of the controller 3 will be described, taking copying of an image onto a paper sheet as an example. When a user instructs copying of an image from the operation unit 5, the CPU 201 sends an image reading command to the scanner device 2 via the CPU 221. The scanner device 2 optically scans a paper document, generates digital image data, and inputs the digital image data into the image processor 227 via the device controller 226. The image processor 227 performs direct memory access (DMA) transfer of the digital image data to the memory 223 via the CPU 221, and temporarily saves the digital image data in the memory 223.

The CPU 201, upon confirming that a certain amount or all of the digital image data has entered into the memory 223, sends an image output command to a printer device 4 via the CPU 221. The CPU 221 informs position of the image data on the memory 223 to the image processor 227, and the image processor 227 transmits the image data on the memory 223 to the printer device 4 via the device controller 226, in accordance with a synchronization signal from the printer device 4. Then, the printer device 4 prints the received image data on a paper.

When printing a plurality of copies, the CPU 201 saves the image data of the memory 223 in the auxiliary storage device 6, and the image data for the second copying and beyond can be sent to the printer device 4 without the need to transfer the image data from the scanner device 2.

Figure 3:
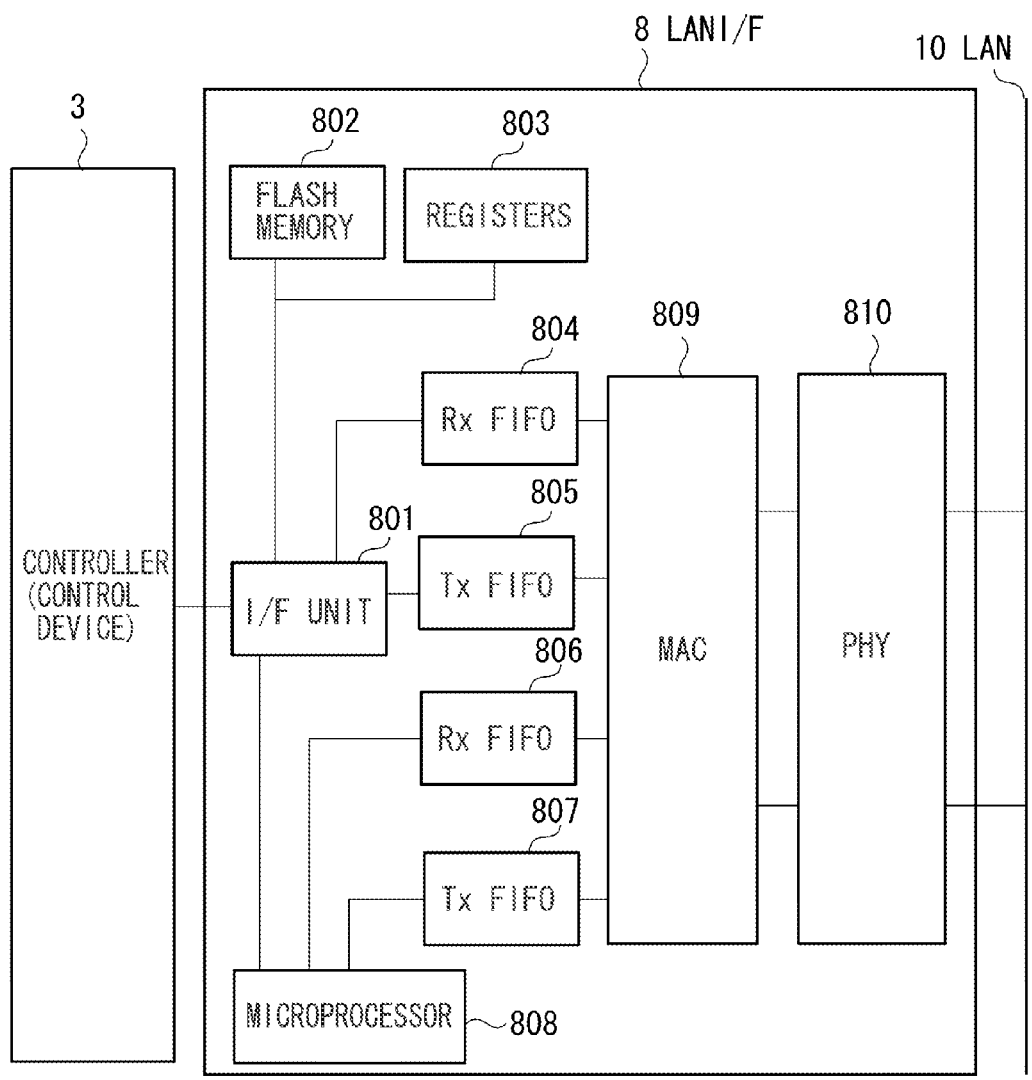
FIG. 3 is a block diagram illustrating a configuration of a local area network interface (LAN I/F) illustrated in FIG. 2.

FIG. 3 is a block diagram illustrating a configuration of the LAN I/F 8 illustrated in FIG. 2. Using FIG. 3, the LAN I/F 8, which is a module to which the present invention is specifically applied, will be described. Hereinbelow, in the present exemplary embodiment, a configuration of the LAN I/F 8, working as a communication unit which performs data communication processing with a plurality of computer terminals, will be described in detail.

In FIG. 3, the LAN I/F 8 is connected to the controller 3 via an interface (I/F) unit 801. When the image forming apparatus 1 receives data from the LAN 10 during the normal mode, a received packet is delivered to a media access controller (MAC) 809 by way of a physical layer (PHY) 810 from the LAN 10. The MAC 809 sets the received packet in an Rx first-in first-out (FIFO) 804, and the received packet is delivered to the controller 3 via an I/F unit 801 from the Rx FIFO 804.

When the image forming apparatus 1 transmits the data to the LAN 10 during the normal mode, a transmitted packet is set in a Tx FIFO 805 via the I/F unit 801 from the controller 3. The MAC 809 reads out the transmitted packet from the Tx FIFO 805 and delivers it to the PHY 810. The transmitted packet is sent out to the LAN 10.

When the image forming apparatus 1 is in the power-saving mode, the received packet is delivered to the MAC 809 by way of the PHY 810 from the LAN 10. The MAC 809 sets the received packet in an Rx FIFO 806, and a microprocessor 808 determines whether the received packet can be responded to, while maintaining the power-saving mode.

If the microprocessor 808 determines that the received packet can be responded to, while maintaining the power-saving mode, the microprocessor 808 generates a response packet corresponding to the received packet, and sets the response packet in the Tx FIFO 807. The MAC 809 reads out the response packet from the Tx FIFO 807 and delivers it to the PHY 810, and the response packet is sent out to the LAN 10.

On the other hand, if the microprocessor 808 determines that the received packet cannot be responded to, while maintaining the power-saving mode, the microprocessor 808 controls the power ON/OFF unit to return the image forming apparatus 1 to the normal mode. In this case, the controller 3 makes a response to the received packet.

A flash memory 802 is composed of non-volatile memories, and is capable of performing exchange of information between the controller 3 and the flash memory 802 via the I/F unit 801. Registers 803 control an operation of the LAN I/F 8, and is a register group which reflects a status of the LAN I/F 8.

A communication speed of the LAN I/F 8 during the power-saving mode is set in the flash memory 802, by the CPU 201. As the communication speed becomes faster, a clock frequency supplied to the microprocessor 808 becomes higher, and a power consumption amount is increased. On the other hand, when the communication speed is low, the clock frequency supplied to the microprocessor 808 becomes low too, and the power consumption amount is lowered.

The communication speed of the LAN I/F 8 during the power-saving mode is set, by the CPU 201 which executes the procedure indicated in the flowchart illustrated in FIG. 5 and FIG. 6 described below. In the present exemplary embodiment, the CPU 201 is configured to decide the communication speed during the power-saving mode, before shifting to the power-saving mode, and to set the decided communication speed in the LAN I/F 8. Further, a frequency of an operating clock supplied to the microprocessor 808 is variably adjusted, and the microprocessor 808 operates in response to the operating clock with the frequency so that the CPU 201 communicates with other apparatuses at the communication speed set using the procedure which follows the flowchart described below. In short, the operating clock supplied to the microprocessor 808 is variably adjusted at the communication speed which the CPU 201 has set in accordance with the procedure that follows the flowchart described below. Thereby, electric energy consumed on the LAN I/F 8 side including the microprocessor 808 is optimized after the CPU 201 has shifted to the power-saving mode from the normal mode.

More specifically, in a case where the communication speed is set to a high-speed by the CPU 201, electric energy consumed on the LAN I/F 8 side is increased. Conversely in a case where the communication speed is set to a low-speed by the CPU 201, electric energy consumed on the LAN I/F 8 side is decreased. Thereby, in cases where traffic in communications with computer terminals is frequent, and infrequent, before the CPU 201 shifts to the power-saving mode, communications with the computer terminals are executed in a state where electric energy consumed on the LAN I/F 8 side is maintained at further power-saving mode.

Figure 4:
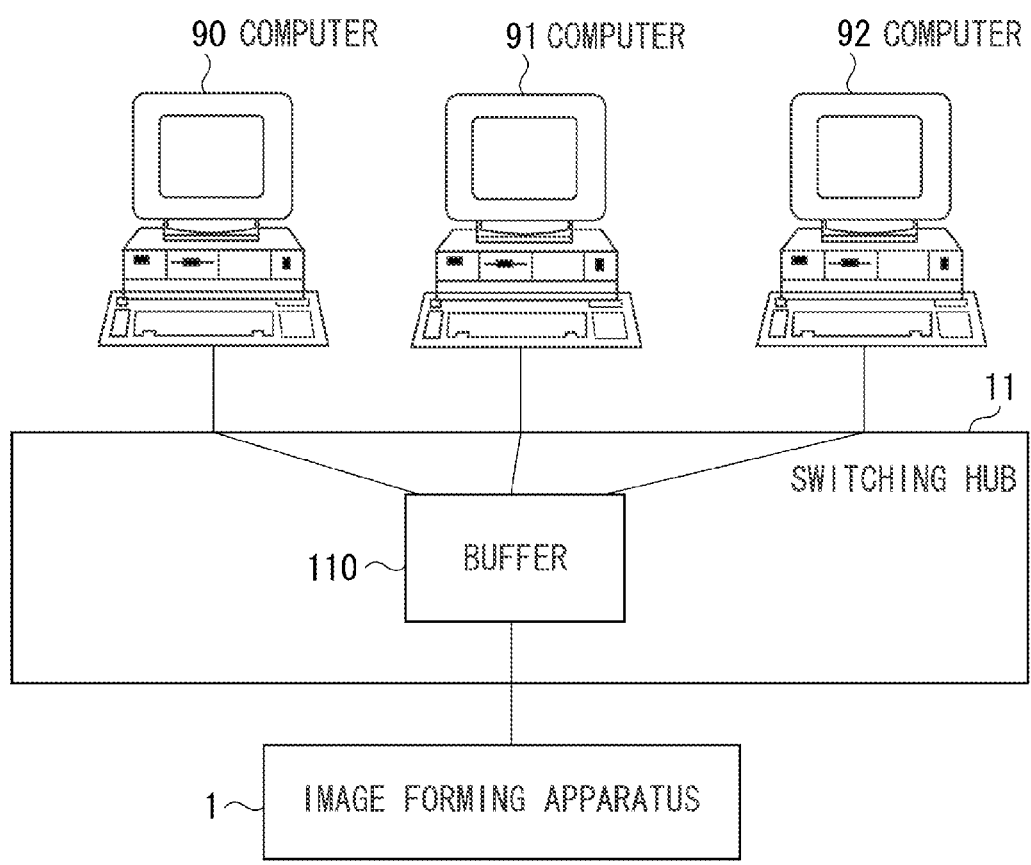
FIG. 4 illustrates a connection example between an image forming apparatus illustrated in FIG. 1 and computer terminals.

FIG. 4 illustrates a connection example of the image forming apparatus 1 illustrated in FIG. 1 and computer terminals. The present example is an example in which the image forming apparatus 1 and a plurality of computer terminals are connected by use of a switching hub 11. Hereinbelow, a link speed between the image forming apparatus 1 and the switching hub 11 is taken as an example of the communication speed. In the connection example illustrated in FIG. 4, the image forming apparatus 1 can communicate with three sets of computer terminals (a computer 90 to a computer 92) via the switching hub 11.

The computer 90 to the computer 92 and the switching hub 11 can communicate with each other at respective link speeds. The computer 90 to the computer 92 can transmit the data to the image forming apparatus 1 by use of a buffer 110.

Further, the image forming apparatus 1 and the switching hub 11 can establish connection at the respective link speeds. The image forming apparatus 1 can receive the data from the computer 90 to the computer 92 by use of the buffer 110.

Figure 5:
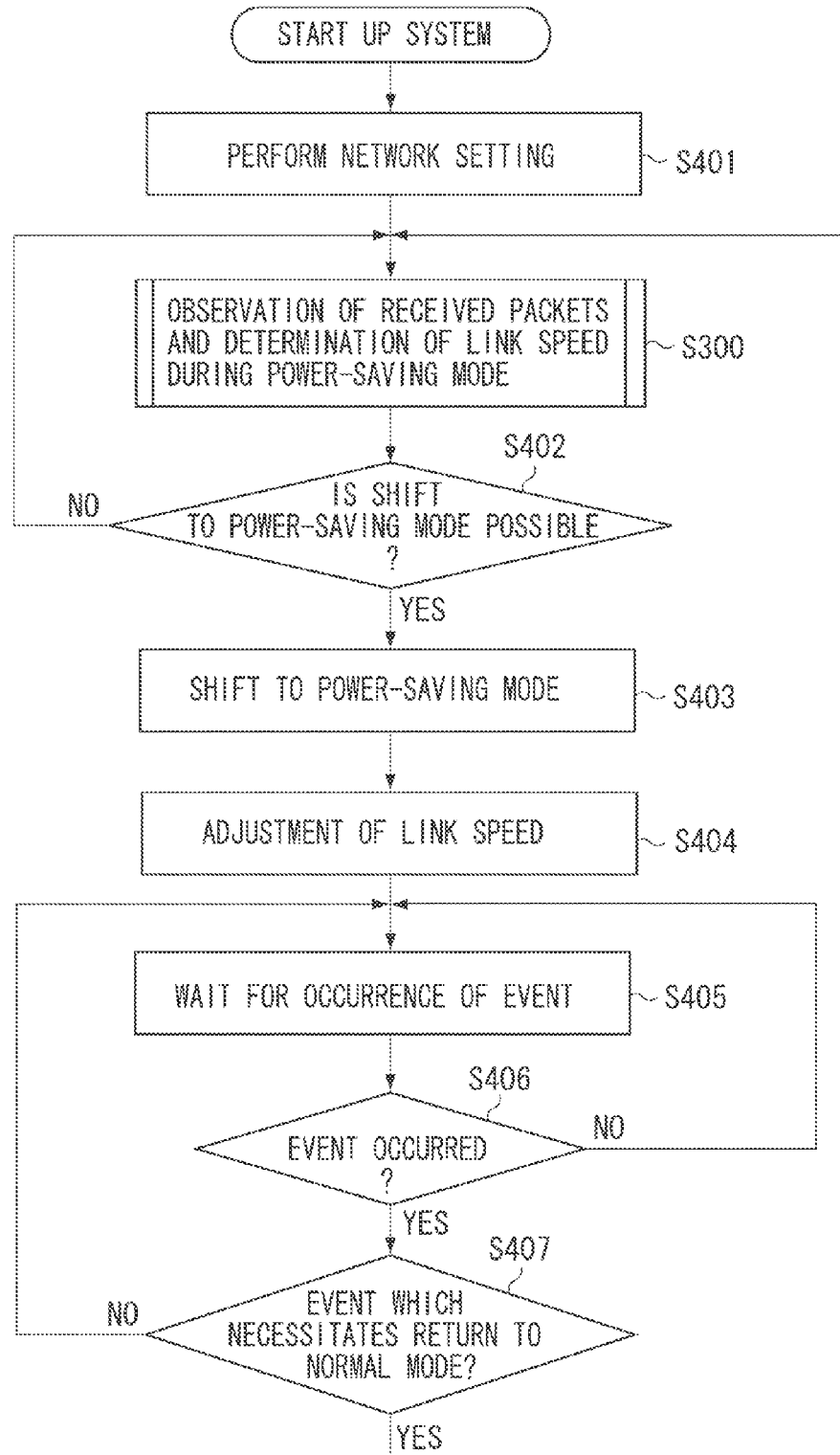
FIG. 5 is a flowchart illustrating a power control procedure of a data processing apparatus.

FIG. 5 is a flowchart illustrating a power control procedure of the data processing apparatus according to the present exemplary embodiment. The present example is processing procedure for shifting to the power-saving mode and returning to the normal mode. Steps S401 to S403 illustrated in FIG. 5 are realized by loading a control program onto the memory 203 and executing it by the CPU 201 illustrated in FIG. 2. Steps S404 to S407 correspond to steps which the microprocessor 808 of the LAN I/F 8 executes. Further, respective steps are by way of examples, and may be configured to incorporate other steps.

When the image forming apparatus 1 is started up, the image forming apparatus 1 is started up to a standby state at a normal power mode. After the image forming apparatus 1 has been started up to the standby state, in step S401, the CPU 201 performs network setting. Thereby, the image forming apparatus 1 becomes able to perform network processing with the computer 90 to 92 and the like via a LAN 10.

In an environment in which the image forming apparatus 1 has been installed, In step S300, the CPU 201 performs observation of the received packet and decision of a link speed when shifting to the power-saving mode next time. The details of step S300 will be described below using FIG. 6.

When the CPU 201 completes step S300, next, in step S402, the CPU 201 determines whether the image forming apparatus 1 can shift to the power-saving mode. If the CPU 201 determines that the image forming apparatus 1 cannot shift to the power-saving mode (NO in step S402), the processing returns to step S300.

On the other hand, in step S402, if the CPU 201 determines that the image forming apparatus 1 can shift to the power-saving mode (YES in step S402), in step S403, the CPU 201 controls the power ON/OFF unit, so that the power supply state of the image forming apparatus 1 shifts to the power-saving mode. Thereby, the power supply to the CPU 201 side is interrupted. Then, in step S404, the microprocessor 808 causes the LAN I/F 8 to transition to a state in which it performs data communication with the switching hub 11 at a link speed set by the CPU 201. Then, in step S405, the microprocessor 808 goes into a state in which it waits for some event to occur. The event is, for example, reception of a print job from the LAN 10.

Next, in step S406, the microprocessor 808 determines whether some event has occurred. If the microprocessor 808 determines that any event has not occurred (NO in step S406), the processing returns to step S405, and again, returns to event waiting state.

On the other hand, if the microprocessor 808 determines that an event has occurred (YES in step S406), furthermore, in step S407, the microprocessor 808 determines whether the event is an event which necessitates return to the normal mode (in short, an event which should cancel the power-saving mode). If the microprocessor 808 determines that the occurred event is not an event which necessitates return to the normal mode (NO in step S407), the microprocessor 808 returns to the event waiting state in step S405.

If the microprocessor 808 determines that the event necessitates return to the normal mode (YES in step S407), the microprocessor 808 controls the power ON/OFF unit, so that the image forming apparatus 1 returns to the normal mode.

In the present exemplary embodiment, in step S407, the microprocessor 808 determines whether the occurred event is an event which causes the image forming apparatus 1 to return to the normal mode from the power-saving mode. If the microprocessor 808 determines as an event which causes the image forming apparatus 1 to return to the normal mode from the power-saving mode, the microprocessor 808 makes a request for causing the CPU 201 to return to the normal mode from the power-saving mode, and shifts to step S300.

Thereby, the CPU 201 returns to the normal mode from the power-saving mode, and resumes data processing. In this process, a request for causing the CPU 201 to return to the normal mode from the power-saving mode is notified to the power ON/OFF unit. Thereby, the power ON/OFF unit performs control so that electric power is supplied to the main board 200 via the power feeding line from the power source apparatus, and energization to the CPU 201 is resumed. Then the CPU 201 returns to the normal mode from the power-saving mode.

Figure 6:
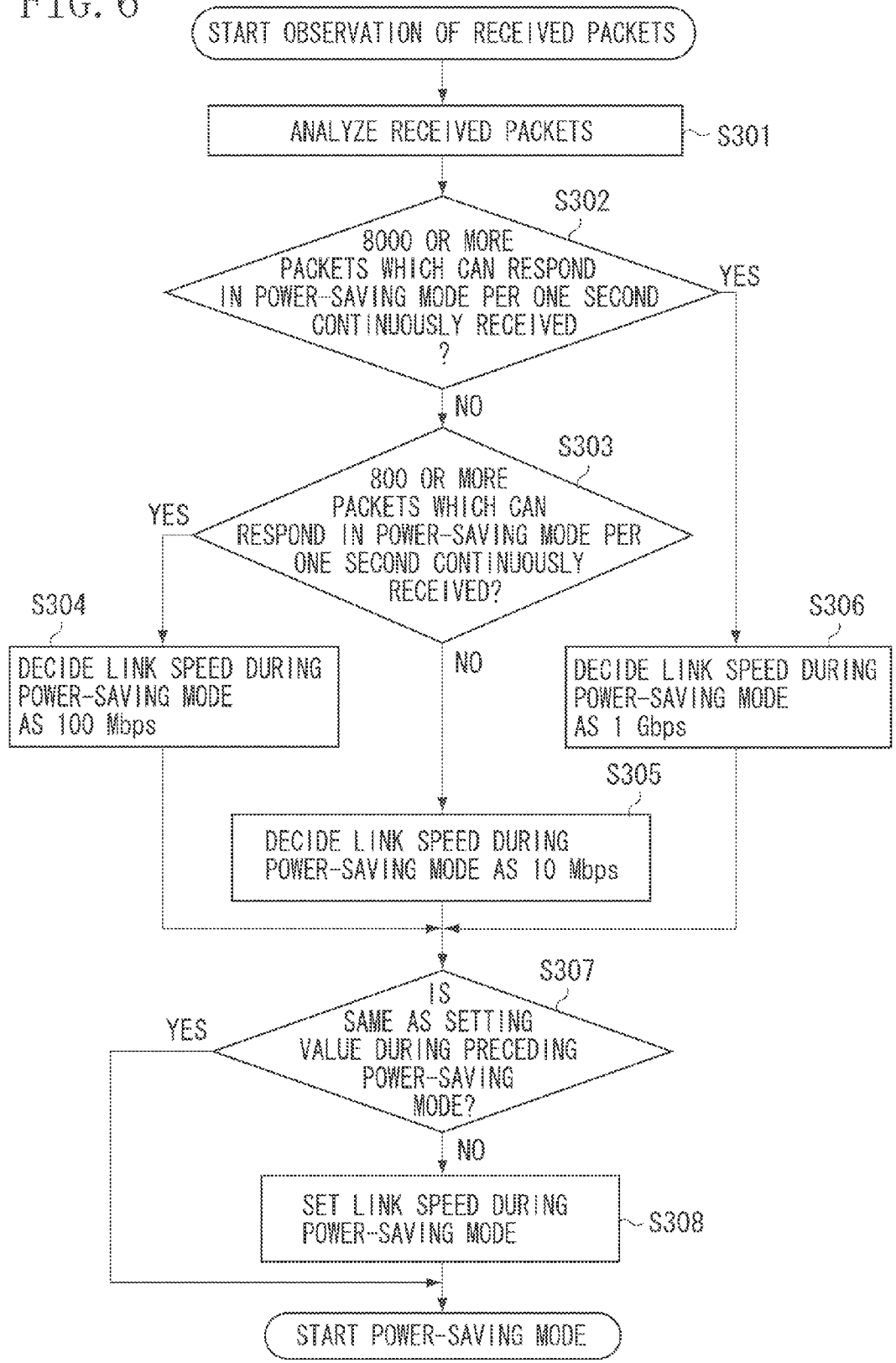
FIG. 6 is a flowchart illustrating a power control procedure of a data processing apparatus.

FIG. 6 is a flowchart illustrating power control procedure of the data processing apparatus according to the present exemplary embodiment. The present example is a detailed procedure in step S300 illustrated in FIG. 5. The respective steps illustrated in FIG. 5 are realized by loading the control program onto the memory 203 and executing it by the CPU 201 illustrated in FIG. 2. Further, the respective steps are by way of examples, and may be configured to incorporate other steps.

After the image forming apparatus 1 has been started up to the standby state, in step S301, the CPU 201 analyzes a packet which the LAN I/F 8 receives.

In a case where the computers 90 to 92 illustrated in FIG. 4 concurrently transmit packets to the image forming apparatus 1, if the image forming apparatus 1 is connected to the switching hub 11 at a low link speed setting, the packets overflow in the buffer 110. Further, if a size of one packet is assumed to be 1500 bytes, 1 Gbps correspond to about 8000 packets/sec, 100 Mbps about 800 packets/sec, and 10 Mbps about 80 packets/sec.

Thus, in step in step S302, the CPU 201 determines whether the LAN I/F 8 has continuously received 8000 or more packets per one second which can be responded to, in the power-saving mode, as a result of the analysis in step S301. The image forming apparatus 1 can recognize a type of the packet which can be responded to, in the power-saving mode, by a file stored in the auxiliary storage device 6. In the file, feature of the packet which can be responded to, in the power-saving mode is written. If the CPU 201 determines that the LAN I/F 8 is continuously receiving 8000 or more packets which can be responded to, in the power-saving mode (YES in step S302), in step S306, the CPU 201 decides a link speed during the power-saving mode as 1 Gbps.

On the other hand, in step S302, if the CPU 201 determines that the LAN I/F 8 is not continuously receiving 8000 or more packets which can be responded to, in the power-saving mode (NO in step S302), the processing proceeds to step S303. Then, in step S303, the CPU 201 determines whether the LAN I/F 8 has continuously received 800 or more packets per one second which can be responded to, in the power-saving mode. If the CPU 201 determines that the LAN I/F 8 is continuously receiving 800 or more packets which can be responded to, in the power-saving mode (YES in step S303), in step S304, the CPU 201 decides a link speed during the power-saving mode as 100 Mbps.

On the other hand, in step S303, if the CPU 201 determines that the LAN I/F 8 is not continuously receiving 800 or more packets which can be responded to, in the power-saving mode (NO in step S303), in step S305, the CPU 201 decides a link speed during the power-saving mode as 10 Mbps. Next, in step S307, the CPU 201 determines whether the link speed decided in steps S304 to S306 is the same as the setting value set previously. If the CPU 201 determines that the link speed is equal to setting value set previously (YES in step S307), the processing shifts to the power-saving mode. On the other hand, in step S307, if the CPU 201 determines that the link speed is different from the setting value set previously (NO in step S307), in step S308, the CPU 201 sets the link speed decided in steps S304 to S306 as a link speed during the power-saving mode.

The link speed during the power-saving mode is set in the flash memory 802 within the LAN I/F 8 by the CPU 201. After shifting to the power-saving mode, the microprocessor 808 sets a value of the registers 803 according to the link speed set in the flash memory 802, and the MAC 809 adjusts the link speed according to the value of the registers 803. Furthermore, the microprocessor 808 adjusts a clock supply amount to the microprocessor 808, according to the link speed set in the flash memory 802. If the link speed is made low, frequency of operating clock of the microprocessor 808 is made low.

As described above, according to a network environment in which the image forming apparatus 1 is installed, it becomes possible to perform an optimization of the clock supply amount to the microprocessor 808 during the power-saving mode. Thereby, it becomes possible to perform power-saving enhancement and optimization of performance of the image forming apparatus. Hereinabove, the content stated in the present exemplary embodiment is an example for solving the issue, and is not intended to limit the present invention.

According to the above-described exemplary embodiment, even after the data processing apparatus has shifted to the power-saving mode, data communication can be surely performed, at a communication speed which matches communication state in a network before shifting to the power-saving mode, and with even higher power saving effect.

Further, in the present exemplary embodiment, descriptions have been given of a case where by measuring a packet amount continuously received within a predetermined time, and furthermore, comparing with a plurality of threshold values set in steps S302 and S303, the CPU 201 decides a communication speed of the LAN I/F 8 during the power-saving mode. More specifically, a case where the communication speed is adjusted to three stages insteps S304, S305, and S306 has been described, but the communication speed to be adjusted may be in not only three stages, but also two stages, furthermore, the communication speed which follows a number of stages may be set for the LAN I/F 8.

According to the above-described exemplary embodiment, a data processing apparatus that achieves power-saving enhancement of the communication unit by appropriately deciding a communication speed in the communication unit while the control unit is shifting to the power-saving state, and a control method for the data processing apparatus can be provided.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-276593 filed Dec. 13, 2010, which is hereby incorporated by reference herein in its entirety.

What is claimed is:

1. A data processing apparatus comprising:
   a communication unit configured to communicate with an external apparatuses apparatus on a network; and
   a determination unit configured to determine, based on an amount of packets received by the communication unit, a communication speed to be used when the communication unit communicates with the external apparatus under a condition that the data processing apparatus operates in a power saving mode,
   wherein the communication unit communicates with the external apparatus at the communication speed determined by the determination unit, when the data processing apparatus operates in the power saving mode;
   wherein in a case where the data processing apparatus operates in the power saving mode and the communication unit receives a packet in a particular pattern, the communication unit responds to the packet in the particular pattern while the data processing apparatus maintains the power saving mode and,
   wherein the determination unit determines the communication speed based on an amount of packets in the particular pattern received by the communication unit.

2. The data processing apparatus according to claim 1, wherein the determination unit determines the communication speed based on the amount of packets received by the communication unit before the data processing apparatus shifts to the power saving mode.

3. The data processing apparatus according to claim 1, wherein the determination unit determines the communication speed based on the amount of packets in the particular pattern received by the communication unit before the data processing apparatus shifts to the power saving mode.

4. A method for a data processing apparatus comprising a communication unit configured to communicate with an external apparatus on a network, the method comprising:
   determining, based on an amount of packets received by the communication unit, a communication speed to be used when the communication unit communicates with the external apparatus under a condition that the data processing apparatus operates in a power saving mode;
   communicating with the external apparatus at the communication speed determined by the determining, when the data processing apparatus operates in the power saving mode;
   wherein in a case where the data processing apparatus operates in the power saving mode and the communication unit receives a packet in a particular pattern, the communication unit responds to the packet in the particular pattern while the data processing apparatus maintains the power saving mode; and
   wherein the determining determines the communication speed based on an amount of packets in the particular pattern received by the communication unit.

5. A non-transitory computer readable storage medium storing a computer-executable program of instructions for causing a computer to perform the method according to claim 4.

6. The non-transitory computer readable storage medium according to claim 5, wherein the determining determines the communication speed based on the amount of packets received by the communication unit before the data processing apparatus shifts to the power saving mode.

7. The non-transitory computer readable storage medium according to claim 5, wherein in a case where the data processing apparatus operates in the power saving mode and the communication unit receives a packet in a particular pattern, the communication unit responds to the packet in the particular pattern while the data processing apparatus maintains the power saving mode and,
   wherein the determining determines the communication speed based on an amount of packets in the particular pattern received by the communication unit.

8. The non-transitory computer readable storage medium according to claim 7, wherein the determining determines the communication speed based on the amount of packets in the particular pattern received by the communication unit before the data processing apparatus shifts to the power saving mode.

9. The method according to claim 4, wherein the determining determines the communication speed based on the amount of packets received by the communication unit before the data processing apparatus shifts to the power saving mode.

10. The method according to claim 4, wherein the determining determines the communication speed based on the amount of packets in the particular pattern received by the communication unit before the data processing apparatus shifts to the power saving mode.

* * * * *